United States Patent [19]

Kariya et al.

[11] 4,350,848
[45] Sep. 21, 1982

[54] DATA TRANSMISSION SYSTEM

[75] Inventors: Masatane Kariya; Akimori Tomizawa, both of Toda, Japan

[73] Assignee: Clarion Company, Ltd., Tokyo, Japan

[21] Appl. No.: 157,389

[22] Filed: Jun. 9, 1980

[30] Foreign Application Priority Data

Jun. 15, 1979 [JP] Japan ................................. 54-75433

[51] Int. Cl.³ .......................................... H04M 11/00
[52] U.S. Cl. ................................................. 179/2 DP
[58] Field of Search .............. 179/2 A, 2 AM, 2 DP; 178/4.1 R, 4.1 B; 340/150, 151

[56] References Cited

U.S. PATENT DOCUMENTS 3,553,376 1/1971 Bogaart ........................... 179/2 AM
3,962,546 6/1976 Hashimoto ....................... 179/2 DP
4,009,342 2/1977 Fahrenschon et al. .......... 179/2 DP Primary Examiner—Joseph A. Popek

[57] ABSTRACT

In a system for communicating data between two stations interconnected by way of a telephone line, a data transmission system wherein at least one of the stations includes a telephone set normally connected to said telephone line, a line changer, a data transmitter and a signal detector. When another station is called through the telephone set and a predetermined signal transmitted from said another station is detected by the signal detector, the line changer switches the telephone line from the telephone set to the data transmitter.

4 Claims, 6 Drawing Figures

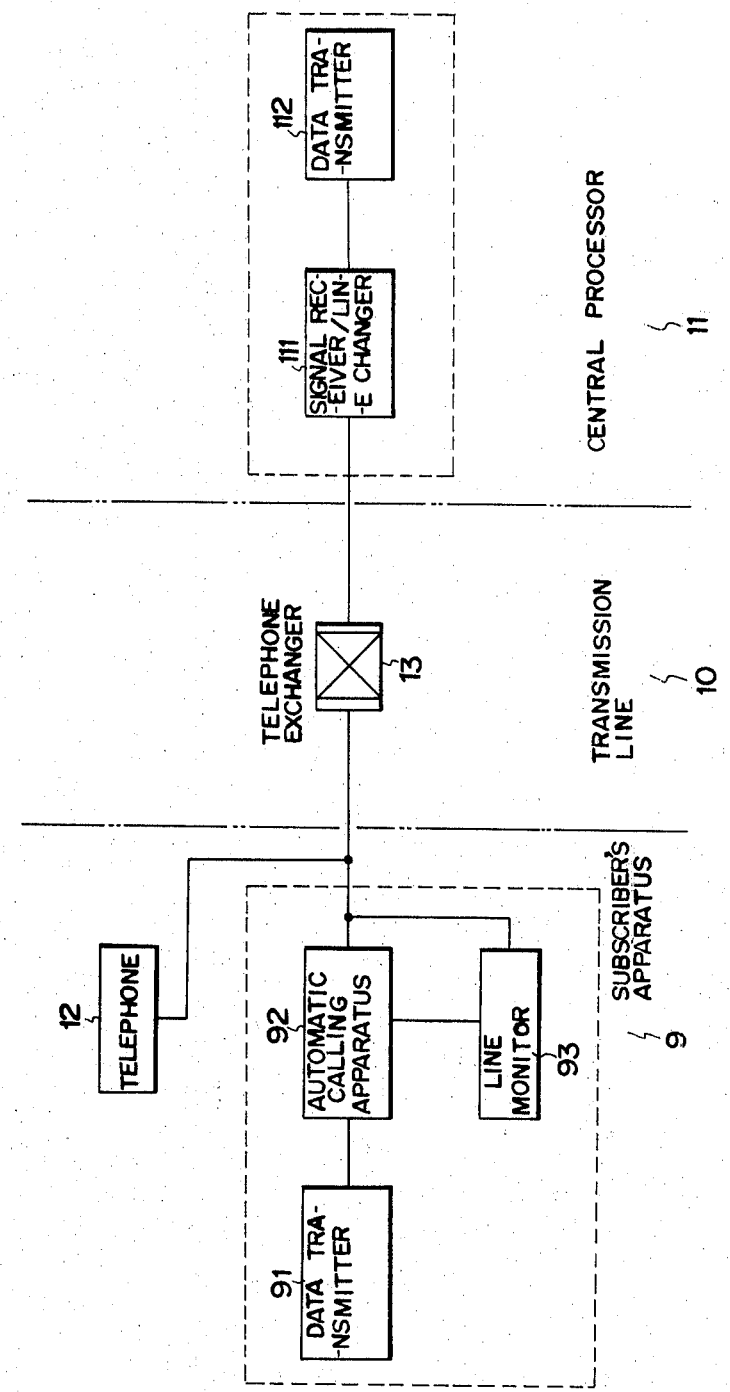

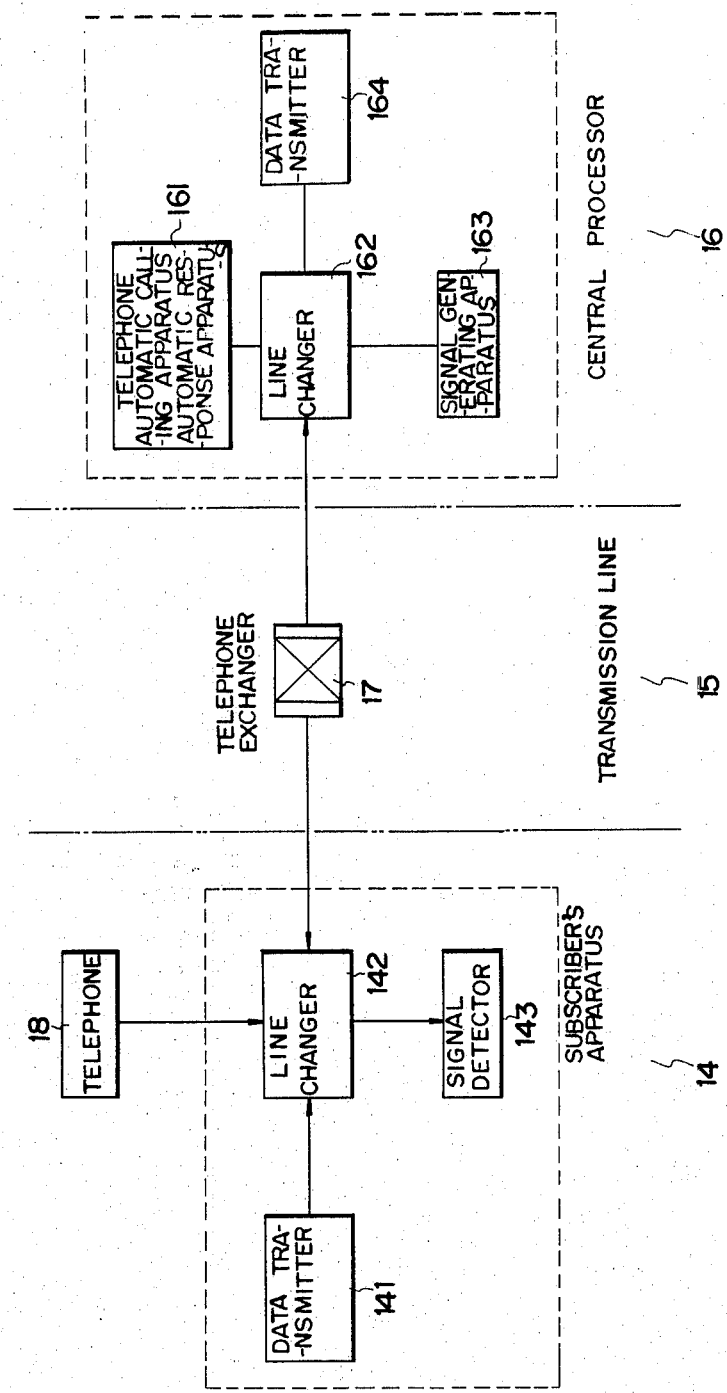

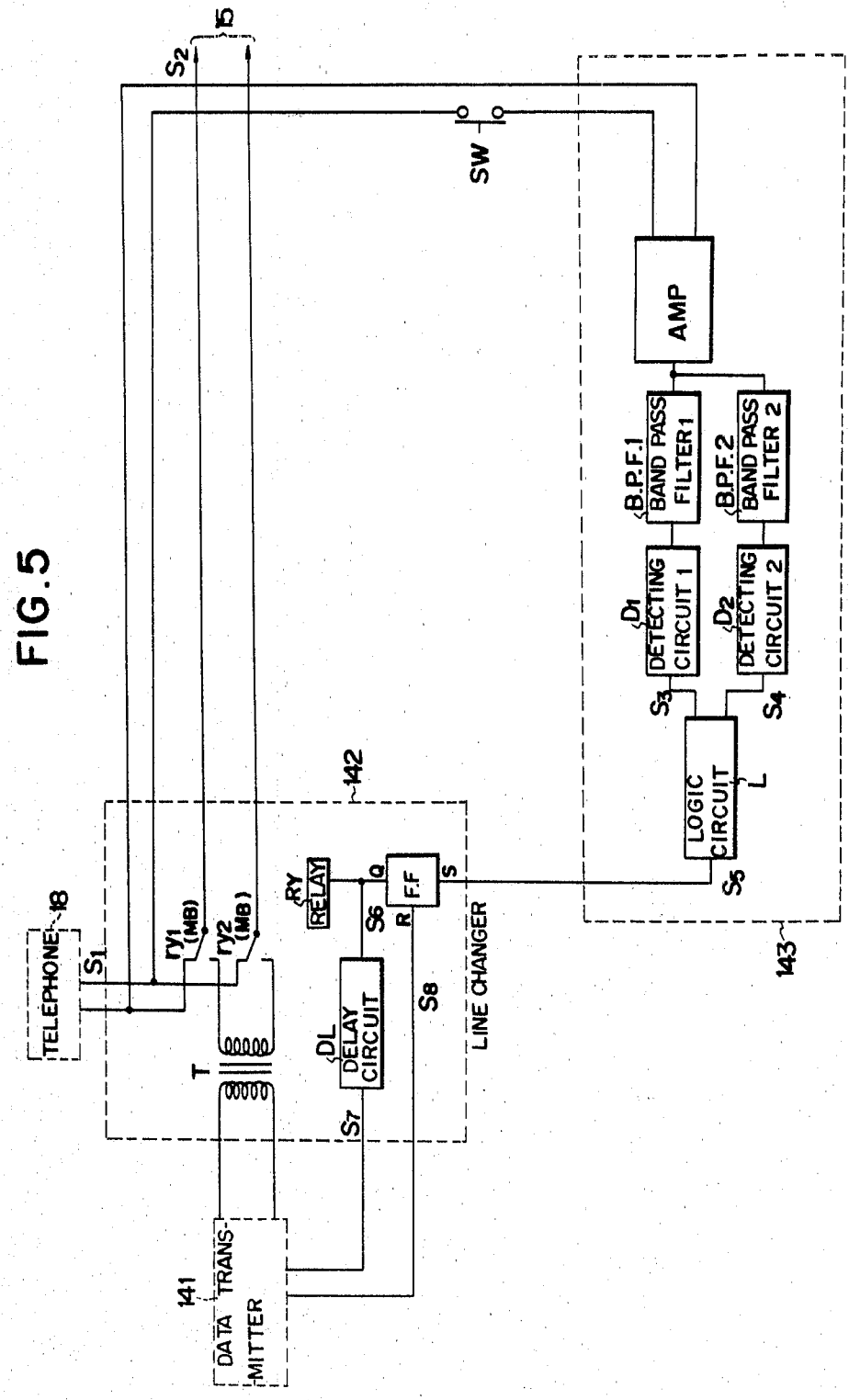

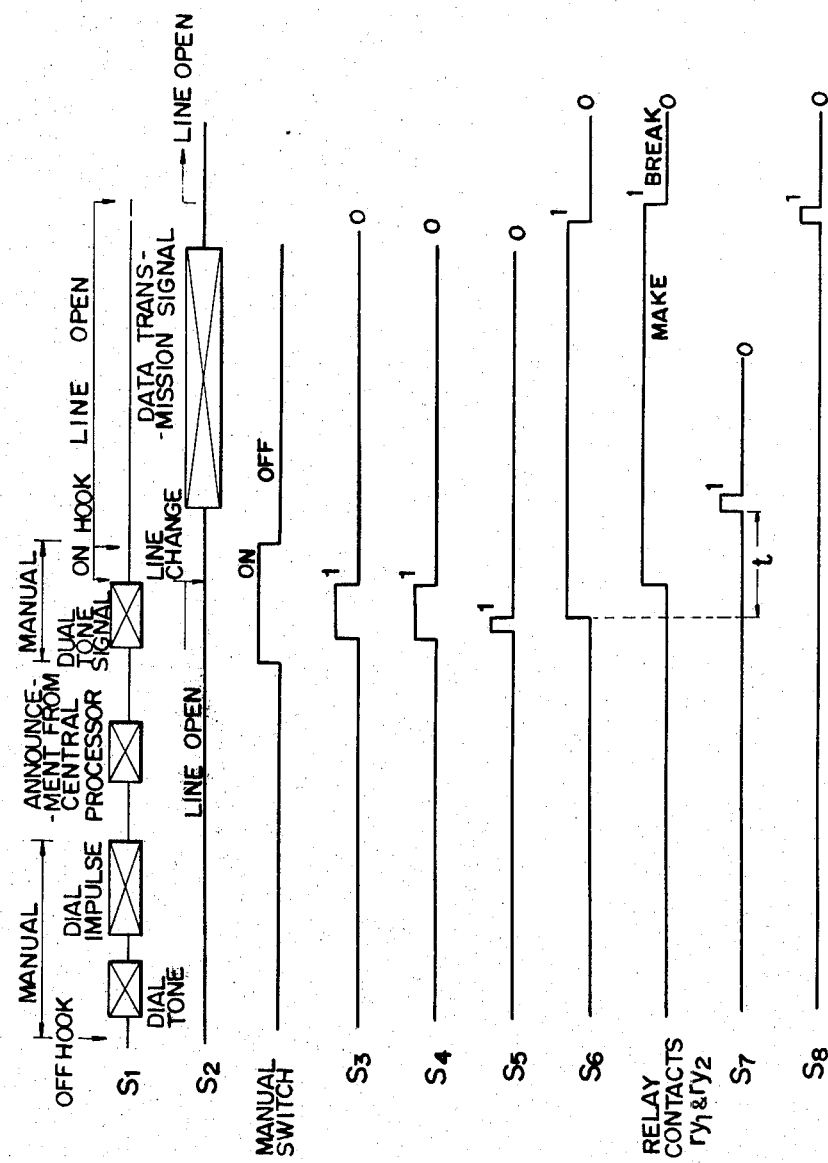

DATA TRANSMISSION SYSTEM

BACKGROUND OF THE INVENTION

1. Field of the Invention

This invention relates to a data transmission system and more particularly, but not by way of limitation, it relates to a data transmission system by way of a telephone line suitable for a pay-TV system.

2. Description of the Prior Art

A pay-TV system has been developed to eliminate troublesome commercial messages or possible degradation in broadcasting quality due to various restrictions involved in free commercial broadcasting. In particular, a wireless pay-TV system has a great future because it can curtail expenses and time required for laying cables.

FIG. 1 is a block diagram of a basic system formation of a wireless pay-TV system. Generally, in the system, since a voluntary program is provided for pay, a television signal is scrambled by an encoder at a station side and received after decoded through a decoder at a subscriber's side and a charge is paid depending on a received amount. In FIG. 1, a program source 1 is contents of a program and an encoder/transmitter 2 scrambles a television signal and transmits the scrambled signal through a transmitting antenna AT1. A decoder 3 decodes the scrambled signal received through a receiving antenna AT2 and outputs to an ordinary TV set 6. On the other hand, the decoder is connected to a converter 4 and a computer system 5 at a transmitting side generally through a telephone line for transmitting data such as data for charges.

FIG. 2 illustrates in detail a basic formation diagram of the decoder illustrated in FIG. 1. A TV signal processor 31 receives the scrambled television signal and decodes it under control of a decode controller 32 to output a decoded signal to the TV set 6. The decode controller 32 controls a TV signal processor 31 and makes the data of charges for programs the subscriber has viewed be stored at a memory 33. An automatic calling apparatus 34 automatically calls the computer system 5 through a transmission line 8 generally formed of a telephone line having a telephone exchanger 7 connected intermediate thereof to establish a data transmission line. A data transmitter 35 transmits the data of charges stored at the memory 33 to the computer system 5 through the transmission line 8 and then receives from the computer system a key code required for decoding the scrambled television signal for storing the code at the memory.

In a wireless pay-TV system, generally, a video signal and an aural signal are radiated into space in the form of radio waves, while transmission of data for charges etc. is carried out according to necessity by way of the telephone line. FIG. 3 is a block diagram of a conventional data transmission system using a telephone line. As soon as the system of FIG. 3 is automatically or manually put into starting conditions when data transmission is required, an automatic calling apparatus 92 produces a timing signal for starting an operation and lets a line monitor 93 detects the line is occupied by a telephone set 12. When the line monitor 93 detects that the line is not occupied by the telephone set 12, the automatic calling apparatus 92 catches the line 10 and automatically transmits a preliminarily selected signal (a tone signal or a dial impulse signal corresponding to a telephone number of a central equipment 11).

The central equipment 11 is comprised of a signal receiver/line changer 111 and a data transmitter 112 automatically responds to a calling signal coming from the line based on the calling from a subscriber's equipment 9 to establish a transmission line 10 with the subscriber's equipment 9. Then, data transmission is carried out between a data transmitter 91 of the subscriber's equipment 9 and the data transmitter of the central equipment 11 through the transmission line 10.

Since in the known method, the subscriber's equipment is caused to automatically start, when data transmission is necessitated, to automatically call the central equipment 11 for effecting data transmission, the automatic calling apparatus 92 and the line monitor 93 are required for the system and accordingly the manufacturing cost of the system must be increased. Furthermore, because of its automatic operation, a control circuit should be provided in the subscriber's equipment for assuring a proper operation where the central equipment 11 is busy or where "0" transmission is required for a private branch exchanger used in the system, and accordingly the subscriber's equipment must be complicated.

OBJECTS OF THE INVENTION

It is therefore an object of the present invention to provide a data transmission system simple in structure and reasonable in cost and yet applicable to various signal systems by allowing manual operation for establishment of a transmission line between the subscriber's equipment and the central equipment.

SUMMARY OF THE INVENTION

In accordance with the present invention, there is provided a data transmission system which comprises:
a plurality of subscribers' equipments;
a single central equipment; and
a plurality of telephone lines each interconnecting said subscribers' equipments and said central equipment;
said subscribers' equipments each being comprised of a telephone set, a data transmitter, a signal detector, and a line changer for selectively connecting the telephone set, data transmitter and signal detector thereof to the telephone line associated therewith;
said central equipment including a signal generator for producing a line-switching control signal;
said telephone set and said signal detector being normally connected to the telephone line through said line changer;
said signal detector being adapted to detect the line-switching control signal from said central equipment and to produce a line-switching signal;
said line changer being adapted to switch said telephone line from said telephone set and signal detector to said data transmitter in response to the line switching signal.

BRIEF DESCRIPTION OF THE DRAWINGS

FIG. 3 is a block diagram of a known data transmission system;

FIG. 4 is a block diagram of a data transmission system of the present invention;

FIG. 5 is a diagram of details of a subscriber's equipment as illustrated in FIG. 4; and FIG. 6 is a timing diagram for explaining operations of the system illustrated in FIGS. 4 and 5.

DESCRIPTION OF THE PREFERRED EMBODIMENT

Figure 1:
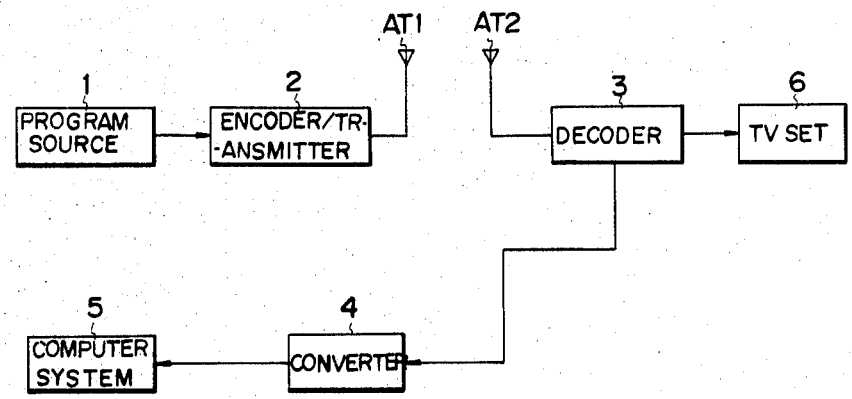
FIG. 1 is a block diagram of a basic system formation of a pay-TV system to which a data transmission system of the present invention is applied.
Figure 2:
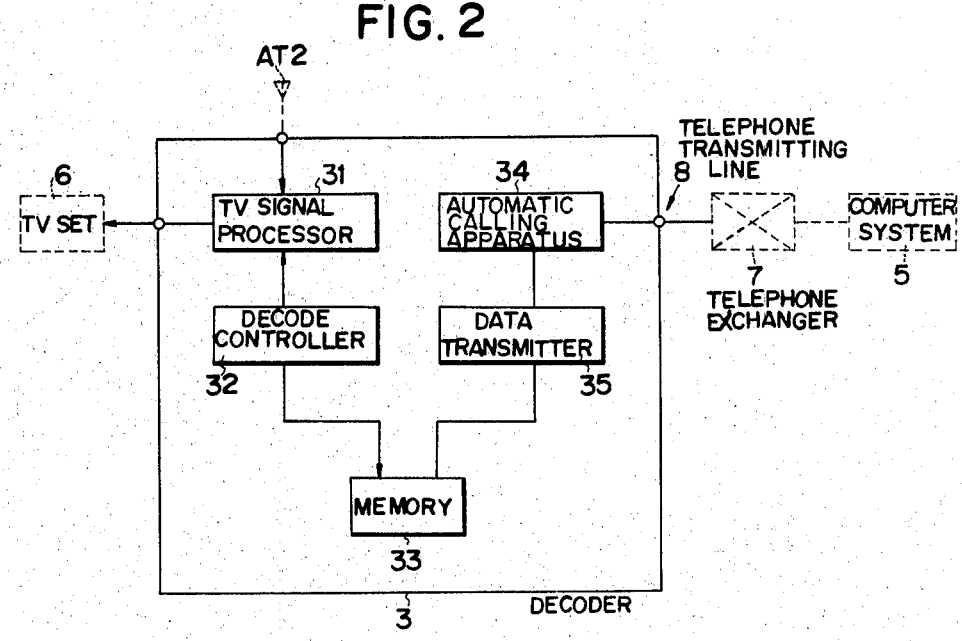
FIG. 2 is a block diagram of a basic formation of a decoder illustrated in FIG. 1.

Referring now to the drawings, there is illustrated a preferred embodiment of the present invention.

FIG. 4 is a block diagram of a data transmission system according to the present invention. The data transmission system is comprised of subscribers' equipments 14, a central equipment 16 and transmission lines 15 utilizing telephone lines and having respective telephone exchangers 17 connected intermediate thereof.

Each of the subscribers' equipments 14 includes a telephone set 18, a data transmitter 141, a line changer 142 and a signal detector 143, while the central equipment 16 includes a telephone set 161 (or automatic calling/answering apparatus etc.), a data transmitter 164, a line changer 162 and a signal generating apparatus 163. The transmission line 15 is preferably formed of a subscriber's telephone line and provides a data transmission path between the subscriber's equipment 14 and the central equipment 16 through the telephone exchanger 17. The data transmitter 141 is a standard device and the one disclosed in U.S. Pat. No. 4,104,486 is an example of a suitable data transmitter.

The subscriber's equipment 14 is used as a terminal equipment in the present data transmission system and, in general, a plurality of subscribers' equipments 14 are connected to one central equipment 16 through respective transmission lines 15. The data transmitter 141 of the subscriber's equipment 14 makes communication of data with the central equipment 16 in response to a transmission initiation control signal from the line changer 142 after the transmission line 15 has been established. The line changer 142 switches the transmission line (telephone line) 15 between a side where it is connected to the telephone set 18 and a side where it is connected to the data transmitter 141 and the signal detector 143. The signal detector 143 detects a predetermined signal for line switching control supplied from the central equipment 16 through the transmission line 15.

The data transmitter 164 of the central equipment 16 performs data communication with the subscriber's equipment 14 in the same manner as the data transmitter 141 of the subscriber's equipment 14 does. The line changer 162 switches the line between the telephone set 161 and the data transmitter 164 or release the same. The signal generating apparatus 163 produces the predetermined signal to be detected by the signal detector 143 of the subscriber's equipment 14 for controlling line switching operation. If necessary, (for example, where the automatic calling/answering apparatus are employed), a circuit for providing and transmitting announcement to an operator (subscriber) of the subscriber's equipment may be provided. The telephone set 161 of the central equipment 16 may be replaced by an automatic calling/answering equipment, if necessary, as mentioned above.

FIG. 5 illustrates in detail a principal portion of the subscriber's equipment illustrated in FIG. 4. The line changer 142 is comprised of a transformer T, a delay circuit DL, a flip-flop circuit FF, a relay RY and its contacts ry 1 and ry 2. The transformer T forms a part of a path for a d.c. loop when the line 15 is switched to the data transmitter side and it further provides insulation between the line 15 and the data transmitter 141 and effects impedance matching between the line 15 and an input circuit of the data transmitter 141. The flip-flop FF is set by an output of a logic circuit L of the signal detector 143 and keeps the relay RY excited until it is reset by a control signal from the data transmitter 141. The contacts ry 1 and ry 2 of the relay RY are provided to switch the line 15 between the telephone set 18 and the data transmitter 141 (through the transformer T). Since the contacts ry 1 and ry 2 are of make-before-break type, line break at the time of switching can be prevented. The delay circuit DL delays, for a predetermined time period, transmission of a Q-output to the data transmitter 141 after the flip-flop circuit FF has been set, so as to make sure that the desired data transmission is initiated only after the line 15 has been switched to the data transmitter side without fail.

The signal detector 143 is comprised of an amplifier AMP, band pass filters BPF 1 and BPF 2, detecting circuits $D_1$ and $D_2$ and a logic circuit L. The logic circuit L is a standard component and typically may be an AND gate. Between the signal detector 143 and the line changer 142 is connected a manual switch SW. This switch SW serves to prevent the signal detector 143 from being kept connected to the line 15, receiving a signal input unnecessarily, when the telephone is busy.

The amplifier circuit AMP is connected to the line 15 through an A.C. means for amplifying the predetermined signal transmitted from the central equipment through the line 15 so that the signal may be discriminated and processed by circuits at the following stages. In the embodiment as illustrated, the predetermined signal transmitted from the signal generating apparatus 153 of the central equipment 16 is a dual tone signal (a two-frequency composite signal), and therefore two band pass filters BPF 1 and BPF 2 are employed to separate the composite signal into its component signals. The detecting circuits $D_1$ and $D_2$ are formed, for example, of an integrating circuit and a Schmitt trigger circuit and detect whether signals from the respective band pass filters are correct, predetermined signals. When the logic circuit L receives the two-frequency composite signal and identifies as being the correct signal, it outputs a setting signal to the flip-flop circuit FF of the line changer 142.

The operation will now be described referring to FIGS. 4, 5 and 6. FIG. 6 illustrates the most common operation sequence according to the present invention.

When data transmission is required, the subscriber takes off a handset (off-hook operation) and confirms a dial tone. When the subscriber dials a selection number (dial number) assigned to the central equipment 16 to call the central equipment 16. At this time, if the central equipment is not busy, the calling from the subscriber is automatically answered and the transmission line 15 is established so as to transmit an announcement to the subscriber. The announcement contains a message such as "This is CENTRAL EQUIPMENT. Push the switch and wait until you hear a peep sound. When you hear the peep sound, return the handset to the original position." Where the central equipment employs a telephone set, an operator of the central equipment can perform the foregoing operations.

The subscriber pushes the manual switch pursuant to the instructions of the announcement from the central equipment 16. Then, the predetermined signal from the central equipment 16 is supplied to the signal detector 143. The predetermined signal supplied to the signal detector 143 is amplified by the amplifier circuit AMP, separated into single-frequency signals by the band pass filters BPF 1 and BPF 2 and judged as to whether they are the desired signals by the detecting circuits $D_1$ and $D_2$. When the two detecting circuits $D_1$ and $D_2$ produce detection outputs, respectively, the logic circuit L supplies a signal to a set input S of the flip-flop circuit FF to put the flip-flop circuit into a set condition. As soon as the flip-flop circuit FF is set, the relay RY is actuated by the Q-output of the flip-flop circuit FF so that the transmission line 15 is switched from the telephone set 18 and the signal detector 143 to the data transmitter 141 by means of the contacts ry 1 and ry 2. This disables the subscriber to hear the signal from the central equipment and therefore the subscriber returns the handset (on-hook operation). When a predetermined time t has passed after the flip-flop circuit FF is set, the delay circuit DL supplies a signal to the data transmitter 141 so as to start desired data transmission to the central equipment. When the data transmission has completed, the data transmitter 141 supplies a reset input R of the flip-flop circuit FF as a transmission completion signal to reset the flip-flop circuit FF. Then, the relay RY is also reset to the original position to switch the transmission line 15 to the telephone set 18 and the signal detector 143 and release the line.

As mentioned above, in accordance with the present invention, since a data transmission line is established by a manual operation, an automatic calling apparatus and a line monitor which are conventionally requisite for each of the terminal equipments may be omitted. Therefore, the structure of the equipments can be simplified and the manufacturing cost thereof can be reduced. Furthermore, the line can be established easily without requiring complicated control circuits even where the telephone number to be called requires transmission of "0" so as to allow processing by a private branch exchanger or a pause time. Thus, the present invention can be applied to a system having special signal systems.

It is claimed :

1. A data transmission system which comprises:
a plurality of subscribers' equipment;
a single central equipment; and
a plurality of telephone lines each interconnecting said subscribers' equipment and said central equipment;
said subscribers' equipment each being comprised of a telephone set, a data transmitter, a signal detector, a manual switch and a line changer for selectively connecting the telephone set, data transmitter and signal detector thereof to the telephone line associated therewith;
said manual switch being connected between said line changer and said signal detector;
said telephone set being normally connected to the telephone line through said line changer to call the central equipment when data transmission is required from the data transmitter to the central equipment;
said signal detector being connected to the telephone line through said line changer and said manual switch;
said central equipment being responsive to a call from said telephone set to provide an announcement thereto and including a signal generator for providing a control signal;
said signal detector including means for detecting the control signal from said central equipment when said manual switch is operated by the subscriber and producing a line switching signal;
said line changer including means for switching said telephone line from said telephone set and signal detector to said data transmitter in response to the line switching signal.

2. A data transmission system as claimed in claim 1, wherein said line changer includes a delay circuit and is connected to said data transmitter through said delay circuit.

3. A data transmission system as claimed in claim 1, wherein said signal detector comprises two bandpass filters and two detecting circuits, and wherein said control signal is a dual tone signal.

4. A data transmission system as claimed in claim 1, wherein said data transmitter supplies a transmission completion signal when data transmission has been completed, and wherein said line changer comprises a relay and a flip-flop circuit, with said flip-flop circuit having set and reset states and being set by the line-switching signal from said signal detector and reset by said transmission completion signal from said data transmitter, and with said relay being actuated by an output of said flip-flop circuit for switching said telephone line from said telephone and said signal detector to said data transmitter.

* * * * *